US008700231B2

(12) United States Patent
Skarman

(10) Patent No.: US 8,700,231 B2
(45) Date of Patent: Apr. 15, 2014

(54) DEVICE AT AN AIRBORNE VEHICLE AND A METHOD FOR COLLISION AVOIDANCE

(75) Inventor: Erik Skarman, Linköping (SE)

(73) Assignee: SAAB AB, Linköping (SE)

( * ) Notice: Subject to any disclaimer, the term of this patent is extended or adjusted under 35 U.S.C. 154(b) by 1485 days.

(21) Appl. No.: 12/003,307

(22) Filed: Dec. 21, 2007

(65) Prior Publication Data

US 2008/0249669 A1 Oct. 9, 2008

(30) Foreign Application Priority Data

Dec. 22, 2006 (EP) .................................... 06127063

(51) Int. Cl.

| | |
|---|---|
| ***G01C 23/00*** | (2006.01) |
| ***G05D 1/00*** | (2006.01) |
| ***G05D 3/00*** | (2006.01) |
| ***G06F 7/00*** | (2006.01) |
| ***G06F 17/00*** | (2006.01) |

(52) U.S. Cl.
USPC ............... 701/3; 701/120; 701/122; 701/301; 244/75.1; 244/76 R

(58) Field of Classification Search
USPC ............... 701/3–18, 117, 120–122, 300–302; 244/75.1, 76 R–182, 191, 96
See application file for complete search history.

(56) References Cited

U.S. PATENT DOCUMENTS

| | | | | |
|---|---|---|---|---|
| 5,448,233 A * | 9/1995 | Saban et al. | .................. | 340/963 |
| 5,868,358 A * | 2/1999 | Nakamura | .................... | 244/169 |
| 6,201,482 B1 | 3/2001 | Schiefele et al. | | |
| 6,262,679 B1 * | 7/2001 | Tran | ................................ | 342/29 |
| 6,278,396 B1 * | 8/2001 | Tran | ................................ | 342/29 |
| 6,510,388 B1 | 1/2003 | Sporrong et al. | | |
| 6,546,338 B2 | 4/2003 | Sainthuile et al. | | |
| 6,675,076 B1 * | 1/2004 | Moody | ........................... | 701/11 |
| 6,691,034 B1 * | 2/2004 | Patera et al. | .................. | 701/301 |
| 6,820,006 B2 * | 11/2004 | Patera | ........................... | 701/301 |
| 2003/0014165 A1 * | 1/2003 | Baker et al. | ........................ | 701/3 |
| 2009/0088972 A1 * | 4/2009 | Bushnell | ....................... | 701/210 |

FOREIGN PATENT DOCUMENTS

| | | |
|---|---|---|
| DE | 4327706 A1 | 2/2003 |
| GB | 2315138 A | 1/1998 |
| WO | WO-01/13138 A1 | 2/2001 |
| WO | WO-2006/021813 A1 | 3/2006 |

OTHER PUBLICATIONS

European Search Report—Jun. 6, 2007.

* cited by examiner

*Primary Examiner* — Rami Khatib
(74) *Attorney, Agent, or Firm* — Venable LLP; Eric J. Franklin

(57) ABSTRACT

A device at an airborne vehicle including a flight control system configured to control the behavior of the airborne vehicle based on acceleration commands, a first control unit configured to provide the acceleration commands to the flight control system, and a collision avoidance unit. The collision avoidance unit includes a detection unit arranged to detect whether the airborne vehicle is on a collision course and a second control unit arranged to feed forced acceleration commands to the flight control system upon detection that the airborne vehicle is on a collision course. A method for collision avoidance in an airborne vehicle.

17 Claims, 3 Drawing Sheets

DEVICE AT AN AIRBORNE VEHICLE AND A METHOD FOR COLLISION AVOIDANCE

TECHNICAL FIELD

The present invention relates to a device at an airborne vehicle comprising a flight control system arranged to control the behaviour of the airborne vehicle based on acceleration commands or the like, a first control unit arranged to provide said acceleration commands to the flight control system and a collision avoidance unit.

The present invention further relates to a method for collision avoidance in an airborne vehicle.

BACKGROUND

There are known in the art methods for use by airborne vehicles of detecting when the airborne vehicle is on collision course with another airborne vehicle. Below are listed a few such disclosures regarding detection of when the airborne vehicle is on collision course with another object.

WO 2006/021813 discloses a method of determining if conflict exists between a host vehicle and an intruder vehicle.

WO 1997/34276 describes a method for detecting collision risk in an aircraft. The method involves calculating the probability of one's own aircraft being present in predetermined sectors at a number of selected points in time. These probabilities for one's own aircraft and the probabilities for other objects are used in calculating the probability of one's own aircraft and at least one of the other objects being present in anyone of the sectors simultaneously.

WO 2001/13138 describes another method for detecting the risk of collision with at least one other vehicle. The method comprises steps of collecting information on the position of at least one's own and a second flying vehicle for a predetermined pre-diction time, and deciding, from the predicted courses, if one's own flying vehicle is at risk of colliding with the other flying vehicle. When such a risk is present, a collision warning is issued and a manoeuvre for steering out of the collision course is indicated. If the proposed manoeuvre is not executed, the system performs said manoeuvre.

Also U.S. Pat. No. 6,546,338 relates to the preparation of an avoidance path so that an aircraft can resolve a conflict of routes with another aircraft. In general, the avoidance path is prepared in two parts, an evasive part and a part homing in on the initial route of the aircraft. The evasive part is prepared such that the threatening aircraft takes a path in relation to the threatened aircraft that is tangential to the edges of the angle at which the threatening aircraft perceives a circle of protection plotted around the threatened aircraft. The radius of the circle of protection is equal to a minimum permissible separation distance. Once the avoidance path has been accepted by the aircraft crew, a flight management computer of the aircraft ensures that the avoidance path is followed by the automatic pilot.

U.S. Pat. No. 6,510,388 describes a method for avoidance of collision between fighting aircrafts for example during air combat training. The method comprises calculating a possible avoidance manoeuvre trajectory for the involved aircrafts and comparing the avoidance manoeuvre trajectories calculated for the other aircrafts with the avoidance manoeuvre trajectory calculated for the own aircraft in order to secure that the avoidance manoeuvre trajectory of the vehicle in every moment during its calculated lapse is located at a stipulated predetermined minimum distance from the avoidance manoeuvre trajectories of the other aircrafts. A warning is presented to a person maneuvering the vehicle and/or the aircraft is made to follow an avoidance manoeuvre trajectory previously calculated and stored for the aircraft if the comparison shows that the avoidance manoeuvre trajectory of an aircraft in any moment during its calculated lapse is located at a distance from the avoidance manoeuvre trajectories of any of the other aircrafts that is smaller than the stipulated minimum distance.

To sum up, there are known in the art methods of detecting when an aircraft is on collision course with another object. Further, there are known in the art methods of calculating avoidance manoeuvre trajectories for use upon detection of a collision course. The aircraft can be made following said avoidance manoeuvre trajectories either automatically or under the control of a pilot.

SUMMARY

One object of the present invention is to provide a way of automatically performing avoidance maneuvers in an airborne vehicle upon detection of a collision course with an obstacle, wherein the risk of colliding during the avoidance manoeuvre is minimized.

This has in accordance with one embodiment of the present invention been achieved by means of a device for flight control mounted in an airborne vehicle. The device is suitably mounted in for example an unmanned vehicle (UAV), a fighter aircraft, or a commercial aircraft. The device comprises a flight control system (FCS) arranged to control the behaviour of the airborne vehicle by means of acceleration commands or the like. The term "behaviour" herein refers to the driving of the airborne vehicle. Thus, "control the behaviour" generally means control the airborne vehicle so as to follow a desired path with desired velocities. A first control unit of the device is arranged to provide acceleration commands to the flight control system so as to control the airborne vehicle in accordance with the desired behaviour. A collision avoidance unit of the device comprises a detection unit arranged to detect whether the airborne vehicle is on a collision course and a second control unit arranged to feed forced acceleration commands or the like to the flight control system upon detection that the airborne vehicle is on a collision course.

The device provides a robust control of avoidance maneuvers. This is due to the reason that no avoidance manoeuvre calculations are performed. The device is arranged to directly form data for input to the flight control system instead of first calculating an avoidance manoeuvre trajectory and then form data for input to the flight control system based on the calculated avoidance manoeuvre trajectory. The device is especially advantageous when the airborne vehicle is on a collision course with another airborne vehicle.

In one preferred embodiment of the invention, the detection unit is arranged to determine a first distance to at least one obstacle and a second distance at which said at least one obstacle is estimated to be passed, and to activate the second control unit when the first distance is smaller than a first predetermined value and the second distances is smaller than a second predetermined value. The second distance is in one example determined as a function of the first distance to the obstacle and the time derivative of the line of sight ($\dot{\sigma}$).

In another preferred embodiment, the detection unit is also arranged to deactivate the second control unit when the second distance exceeds a predetermined third value. In accordance with this embodiment, the avoidance maneuvers can be designed to secure that the avoidance manoeuvre trajectory is located at a stipulated predetermined minimum distance from the obstacle. In the case wherein the obstacle is another airborne vehicle, the avoidance maneuvers can be designed to secure that the avoidance manoeuvre trajectory is located at a stipulated predetermined minimum distance from the other the avoidance manoeuvre trajectories of another aircraft on collision course with the own aircraft. Therefore the device is suitable for use at airborne vehicles flying in civilian air territory.

The second control unit comprises in one embodiment a calculation unit arranged to determine a product of a closing velocity ($v_c$) to the obstacle and a time derivative of a line of sight or to the obstacle ($\dot{\sigma}$), and to form the forced acceleration commands based on a negation of the determined product ($v_c \cdot \dot{\sigma}$). It is to be noted that a "bearing" is defined as the direction of the line of sight in relation to north; accordingly the time derivative of the bearing is equivalent to the time derivative of the line of sight. The consequence of producing acceleration commands having a sign that is opposite to the sign of the closing velocity ($v_c$) and the time derivative of the line of sight ($\dot{\sigma}$), is that the time derivative of the line of sight ($\dot{\sigma}$) will, at least in the beginning of the manoeuvre trajectory, grow exponentially and the line of sight therefore is "thrown away", thereby avoiding a collision. If the own airborne vehicle and the obstacle (in this example another airborne vehicle) provide commands to the flight control system in accordance with this embodiment, both vehicles will (after an initial transient) make an avoidance manoeuvre in the same direction (i.e. both to the right or both to the left). If the avoidance manoeuvre is performed in the height direction, one vehicle will make an avoidance manoeuvre up and the other vehicle will make the avoidance manoeuvre down. If the other vehicle is passive, the provision of forced acceleration commands to the flight control system of only the own airborne vehicle, will grant for collision avoidance. Further, if the other vehicle makes an avoidance manoeuvre based on other rules, the provision of forced acceleration commands to the flight control system of the own airborne vehicle will still grant for collision avoidance.

In one preferred embodiment, the calculation unit is arranged to form the acceleration commands based on the equation $a_y = -k \cdot v_c \cdot \dot{\sigma}$, wherein $a_y$ is the acceleration in a direction perpendicular to the travelling direction and k is a positive constant. The constant k lies in one embodiment within the range 1 to 6, for example within the range 2 to 4, such as approximately 3.

In yet another preferred embodiment, the second control unit comprises a pre-calculation unit arranged to compare the time derivative of the line of sight ($\dot{\sigma}$) or an equivalence thereof to a threshold value, and if the threshold value is exceeded, the pre-calculation unit is arranged to activate the calculation unit and if not exceeded, the pre-calculation unit is arranged to feed a predetermined forced acceleration command to the flight control system. This is advantageous, as in providing acceleration commands in accordance with the equation $a_y = -k \cdot v_c \cdot \dot{\sigma}$, and with very small starting values for the time derivative of the line of sight ($\dot{\sigma}$), there will be a delay before the time derivative ($\dot{\sigma}$) perform the characteristic exponential curve. By providing a higher starting value for the time derivative ($\dot{\sigma}$), the time derivative ($\dot{\sigma}$) will immediately perform in accordance with a characteristic exponential curve, and thus the avoidance manoeuvre will start immediately.

In accordance with another embodiment of the present invention, a method for collision avoidance in an airborne vehicle comprises the steps of detecting whether the airborne vehicle is on a collision course, forming forced acceleration commands based on a relation between the aircraft and an obstacle, and providing said forced acceleration commands to a flight control system of the airborne vehicle upon detection that the airborne vehicle is on a collision course with said obstacle so as to avoid collision.

DETAILED DESCRIPTION

The logical block scheme in fig shows a device 1 for flight control mounted in an airborne vehicle. The functional units descried therein are thus logical units; in practice at least some of the units are preferably implemented in a common physical unit The airborne vehicle is in the herein explained example an unmanned airborne vehicle (UAV). However, the device is suitable to be mounted also in other types of airborne vehicles such as fighting aircraft or commercial aircraft.

Figure 1:
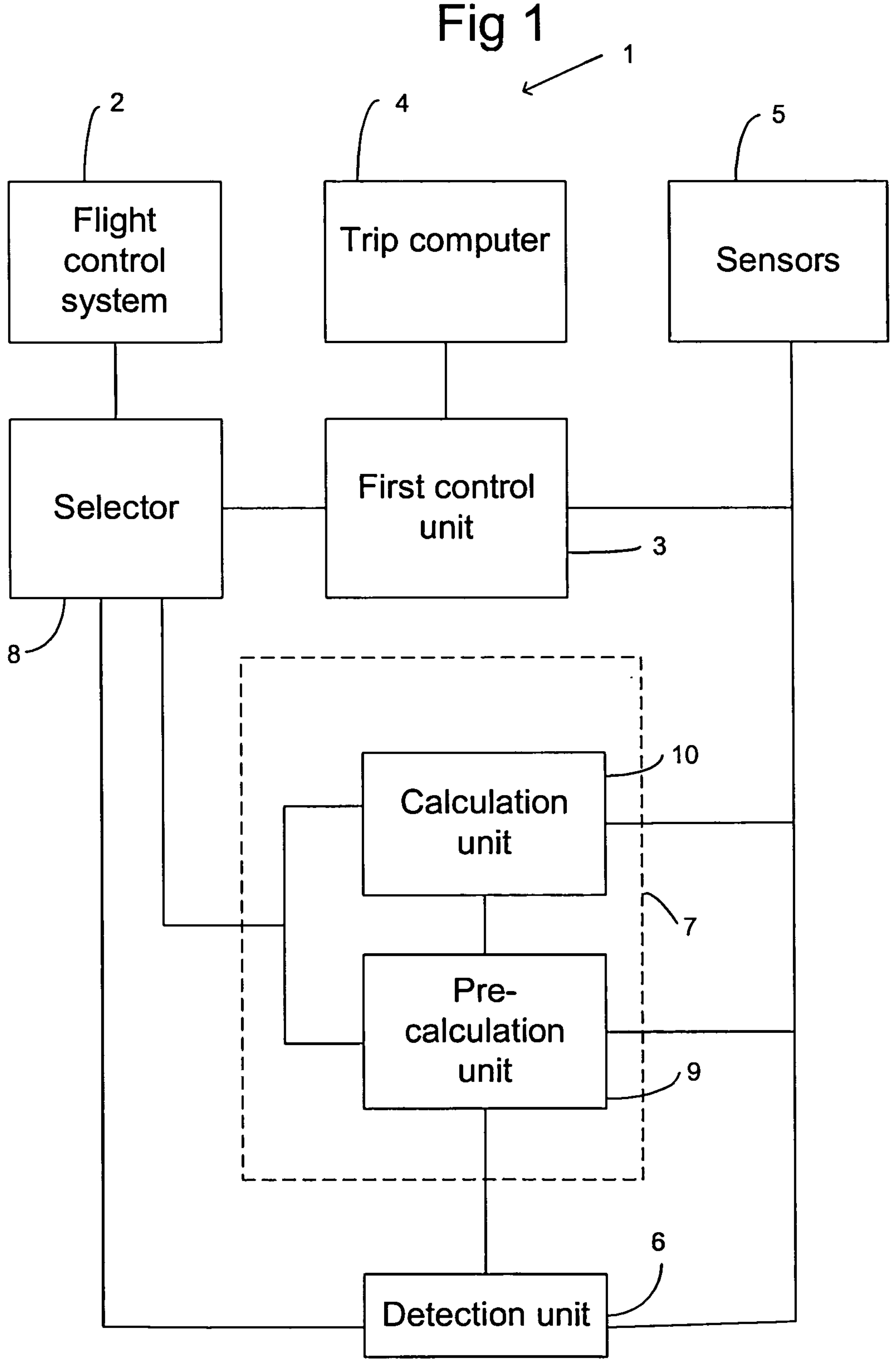
FIG. 1 shows a logical block scheme of a device at an airborne vehicle according to one example of the present invention.

The device 1 of FIG. 1 comprises a flight control system (FCS) 2 arranged to control the behaviour of the UAV based on acceleration commands to said flight control system 2. A first control unit 3 of the device 1 is arranged to provide acceleration commands to the flight control system 2 so as to control the UAV in accordance with the desired behaviour. In the shown example, a trip computer 4 is loaded with information regarding a planned mission. Thus, the behaviour of the UAV is defined by the planned mission. One or a plurality of missions is in one example pre-loaded in a memory of the trip computer. In the case, wherein a plurality of missions is pre-loaded in the memory, selection information can be inputted by means of an interface (not shown) so as to select one mission. The interface is for example a radio receiver, a keyboard or a touch screen. The trip computer 4 is in a not shown example substituted with direct commands. The direct commands are in a case, wherein the airborne vehicle is an UAV, provided by link from ground control. In an alternative case, wherein the vehicle is manned, the direct commands can be provided by the pilot. The first control unit 3 is arranged to provide acceleration commands to the flight control system 2 based behaviour information from the trip computer 4 and based on information regarding the present states of the UAV. The information regarding the present states is provided by means of sensor equipment 5 mounted on the UAV. The sensor equipment 5 include for example an inertial navigation system, radar equipment, a laser range finder (LRF), a transponder, a GPS receiver, a radio receiver etc.

The device 1 also comprises a collision avoidance unit comprising a detection unit 6, a second control unit 7 and a selector 8. The detection unit 6 is arranged to detect whether the UAV is on a collision course with an obstacle. The obstacle is for example another airborne vehicle or the ground. The description will hereinafter relate to the example with another vehicle.

The detection unit 6 is arranged to determine a first distance ($d_1$) to the other airborne vehicle. This first distance ($d_1$) is determined by determining the difference between the position of the UAV and the other vehicle. All or some of the sensors in the sensor equipment 5 operatively connected to the first control unit 3, are operatively connected also to the detection unit 6. The position information for the UAV is for example provided from a sensor in the form of a GPS receiver mounted on the UAV. The position information for the other airborne vehicle is for example received by means of a sensor in the form of a radio receiver arranged to receive information from a transponder on the other vehicle. The information regarding the position of the other vehicle can also be provided by a sensor device arranged to perform measurements on the other vehicle, for example by means radar equipment or a laser range finder (LRF).

The detection unit 6 is also arranged to determine a second distance ($d_2$), at which the other airborne vehicle is arranged to be passed. This second distance ($d_2$) can be described by the following function.

$$d_2 = f(d_1, \dot{\sigma})$$

Figure 2:
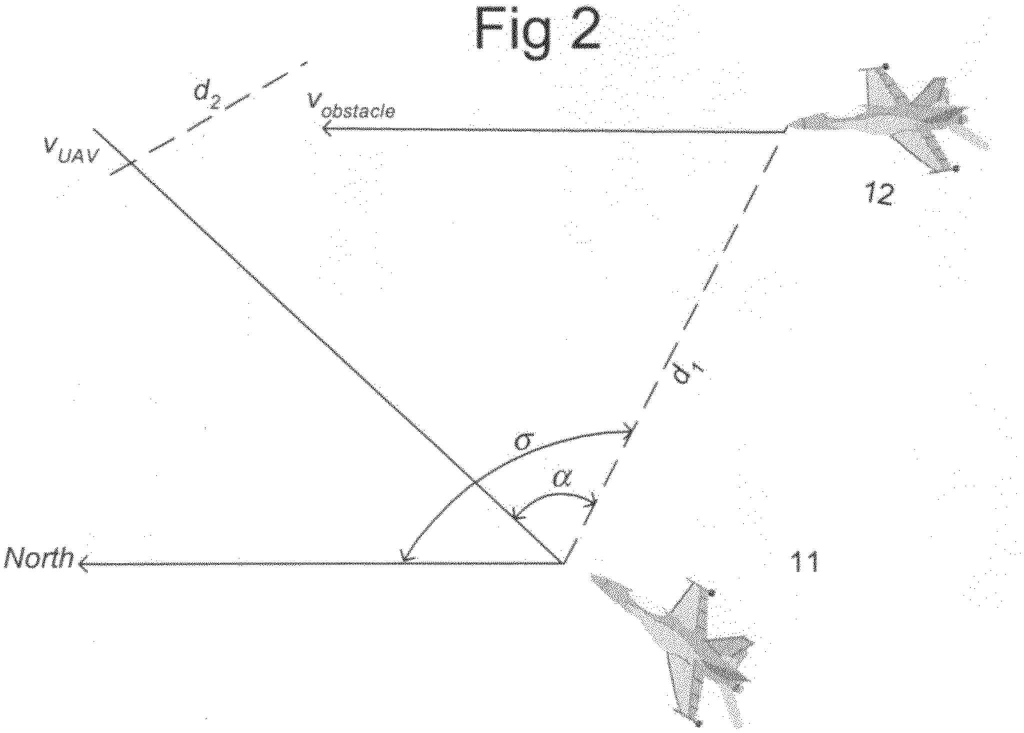
FIG. 2 shows schematically the airborne vehicle in FIG. 1, another airborne vehicle, and the relationship between them.

In FIG. 2, the first distance $d_1$ between the UAV 11 and the other airborne vehicle 12 and the second distance $d_2$ at which the other airborne vehicle 12 is arranged to be passed if the UAV 11 and the other vehicle 12 both continue in their ongoing paths are denoted. An angle σ between north and a line between the UAV 11 and the other airborne vehicle 12 represents the bearing. The time derivative of the bearing equals the time derivative of the line of sight $\dot{\sigma}$.

In one example the sensor equipment comprises a sensor in the form of an inertial navigation system. The inertial navigation system is arranged to provide information regarding the time derivative of the line of sight ($\dot{\sigma}$) to the other object 12. The second distance $d_2$ at which the other airborne vehicle 12 is arranged to be passed can then be defined as $$d_2 \approx \frac{d_1^2}{v} \cdot \dot{\sigma},$$

wherein v represents the magnitude of the relative velocity between the vehicles. In another example, wherein the sensor equipment 5 is not arranged to directly provide the time derivative of the line of sight ($\dot{\sigma}$), the detection unit 6 can be arranged to calculate said time derivative ($\dot{\sigma}$). The detection unit 6 can be arranged to calculate the velocities $v_{obstacle}$ of the other vehicle based on continuously updated, time marked position information for the other airborne vehicle. The detection unit 6 can further be arranged to determine an angle α between a velocity vector $v_{UAV}$ of the UAV and a line between the UAV 11 and the other airborne vehicle 12. The time derivative of the line of sight can the be written as $$\dot{\sigma} = \frac{v_{UAV}}{d_1} \cdot \sin\alpha - \frac{v_{obstacle\perp}}{d_1}$$

wherein $v_{obstacle\perp}$ represents the velocity component of the other vehicle perpendicular to the line of sight.

$d_2$ can then be calculated using the calculated value for $\dot{\sigma}$ in the equation above.

When the first distance ($d_1$) is smaller than a first predetermined value $v_1$ and the second distance ($d_2$) is smaller than a second predetermined value $v_2$, the detection unit 6 is arranged to feed a selection signal to the selector 8 so as to bring the selector 8 in a second mode of operation, wherein forced acceleration commands from the second control unit are fed to the flight control system 2. The first and second predetermined values $v_1$, $v_2$ are preferably chosen such that an avoidance manoeuvre is started when there is a risk that a stipulated minimum distance to the other vehicle can not be kept.

The detection unit 6 is further arranged to continuously update the determination of the second distance ($d_2$) while the selector 8 is working in the second mode of operation. When the second distance ($d_2$) exceeds a third predetermined value $v_3$, the detection unit 6 is arranged to feed a selection signal to the selector 8 so as to bring the selector in a first mode of operation, wherein acceleration commands from the first control unit 3 are fed to the flight control system 2. The third predetermined value $v_3$ is preferably chosen such that it is secured that the avoidance manoeuvre of the UAV is located at a stipulated minimum distance from (an avoidance manoeuvre of) the other airborne vehicle.

Upon detection that the UAV is on a collision course, the detection unit 6 is arranged to provide an activation signal to the second control unit 7. The second control unit 7 comprises a pre-calculation unit 9 arranged to compare the time derivative of the line of sight ($\dot{\sigma}$) to a threshold value. As discussed above, for example a sensor in the form of an inertial navigation system provides measurements of the time derivative of the line of sight ($\dot{\sigma}$). Alternatively, the time derivative of the line of sight ($\dot{\sigma}$) is calculated based on a known relationship between the UAV and the other airborne vehicle, as described above with reference to FIG. 2. If the time derivative of the line of sight ($\dot{\sigma}$) does not exceed the threshold value, a predetermined forced acceleration command is fed to the to the flight control system. On the other hand, if the time derivative of the line of sight ($\dot{\sigma}$) does exceed the threshold value, the calculation unit 10 of the second control unit 7 is arranged to form the forced acceleration commands.

The calculation unit 10 of the second control unit 7 is arranged to continuously form the acceleration commands for the flight control system based on the equation $$a_y = -k \cdot v_c \cdot \dot{\sigma},$$

wherein $a_y$ is the acceleration in a direction perpendicular to the travelling direction, k is a positive constant and $v_c$ is a closing velocity to the other airborne vehicle. The constant k lies in one example within the range 1 to 6, in another example within the range 2 to 4 and in yet another example, the constant k is approximately 3. The closing velocity $v_c$ equals the time derivative of the first distance $\dot{d}_1$. The calculation of the time derivative of the line of sight ($\dot{\sigma}$) has been previously described.

There exist today flight control systems controlling the behaviour of the airborne vehicles in which they are mounted, based on this type of acceleration commands controlling the acceleration perpendicular to the travelling direction. However, this is a non-limiting example; in another example, the flight control system is controlled based on acceleration commands with are not perpendicular to the travelling direction.

Figure 3:
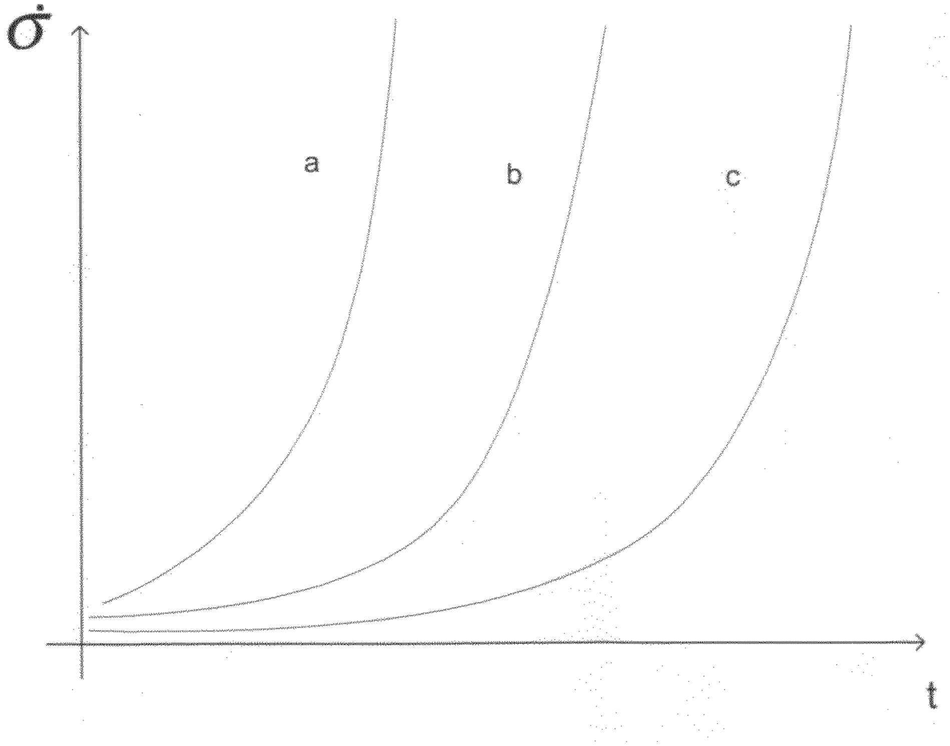
FIG. 3 shows schematically a graph presenting a number of exemplified curves of the time dependence of the characteristic time derivative of the line of sight ($\dot{\sigma}$).

In FIG. 3, the curves a, b, c describe the variation with time of the time derivative of the line of sight ($\dot{\sigma}$) when the flight control system is controlled in accordance with the control law $a_y = -k \cdot v_c \cdot \dot{\sigma}$. The curves are exponentially increasing at least in the beginning of the avoidance maneuvers. From the figure it is seen that the inclination of the exponentially increasing curve differs depending on the starting value of the time derivative of the line of sight ($\dot{\sigma}$). When the starting value of the time derivative of the line of sight ($\dot{\sigma}$) is small, or close to zero, the inclination of the exponentially increasing curve is initially very small. This may delay the initiation of an avoidance manoeuvre. The inclusion of the pre-calculation unit 9 in the second control unit 7 bring the time derivative of the line of sight ($\dot{\sigma}$) to a curve which is immediately increasing exponentially and thus the avoidance manoeuvre is immediately started.

Figure 4:
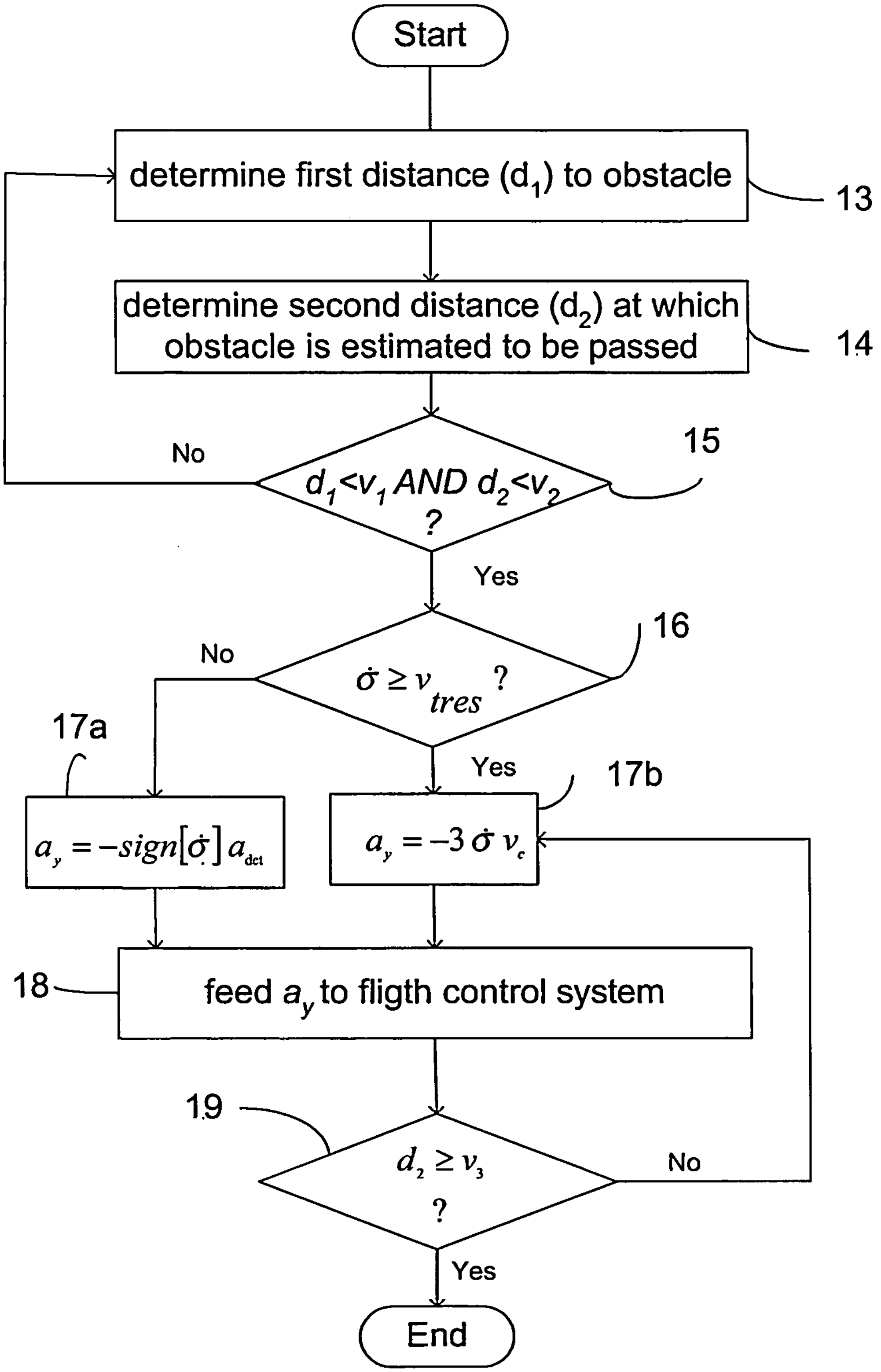
FIG. 4 shows a flow chart over a collision avoidance method according to on example of the present invention.

In FIG. 4, a method for collision avoidance in an airborne vehicle comprises a first step 13 of determining a first distance to at least one obstacle such as another airborne vehicle. In a second step 14, a second distance at which the other airborne vehicle is estimated to be passed is determined. In a third step 15 it is established whether the airborne vehicle is on a collision course with the other vehicle by determining if the determined first distance is smaller than a first predetermined value and if the determined second distances is smaller than a second predetermined value. If the first distance is not smaller than the first predetermined value and/or the second distance is not smaller than the second predetermined value, it is established that the vehicles are not on a collision course and the procedure jumps back to the first step 13. On the other hand, if both the first distance is smaller than the first predetermined value and the second distance is smaller than the second predetermined value, it is established that the vehicles are on a collision course. Then, in a fourth step 16 a time derivative of a line of sight ($\dot{\sigma}$) to the other vehicle is compared to a threshold value. If the comparison shows that the threshold value has not been exceeded, in a fifth step 17*a*, a forced acceleration command is formed in a direction perpendicular to the travelling direction of the UAV, which forced acceleration command having a predetermined magnitude $a_{det}$ and a sign opposite the sign of the time derivative of a line of sight ($\dot{\sigma}$). If the comparison shows that the threshold value has been exceeded, in a fifth step 17*b* a forced acceleration command in a direction perpendicular to the travelling direction of the UAV is formed by the equation $a_y=-k\cdot v_c\cdot\dot{\sigma}\cdot a_y$ is as mentioned an acceleration in a direction perpendicular to the travelling direction, k is a positive constant and $v_c$ is a closing velocity to the other vehicle.

In a sixth step 18, the acceleration command formed in either alternative of the fifth step 17*a*, 17*b* is fed to a flight control system of the airborne vehicle. In a seventh step, the second distance is again determined and compared to a third predetermined value. If the third predetermined value has been exceeded, it is determined that there is not a risk for collision. Accordingly, it is no longer suitable to provide forced acceleration commands to the flight control system. Therefore, the procedure ends and can preferably be restarted from the first step regarding another obstacle. However, if the third predetermined value has not been exceeded, it is determined that there still is a risk of collision, and accordingly, the collision avoidance manoeuvre shall continue. The procedure then jumps back to the fourth step 16, wherein it is determined according to which version of the fifth step 17*a*, 17*b* the acceleration command shall be determined.

The invention claimed is:

1. A device at an airborne vehicle, comprising:

a flight control system arranged to control the behaviour of the airborne vehicle based on acceleration commands, a first control unit arranged to provide said acceleration commands to the flight control system based on planned missions or direct commands, a detection unit configured to detect whether the airborne vehicle is on a collision course, a collision avoidance unit comprising a second control unit arranged to directly feed forced acceleration commands to the flight control system upon detection that the airborne vehicle is on a collision course.

2. The device at an airborne vehicle according to claim 1, wherein the detection unit is configured to determine a first distance to at least one obstacle and a second distance at which said at least one obstacle is estimated to be passed, and to activate the second control unit when the first distance is smaller than a first predetermined value and the second distances is smaller than a second predetermined value.

3. The device at an airborne vehicle according to claim 2, wherein the detection unit is configured to deactivate the second control unit when the second distance exceeds a predetermined third value.

4. The device at an airborne vehicle according to claim 1, wherein the second control unit comprises a calculation unit configured to determine a product of a closing velocity ($v_c$) to the obstacle and a time derivative of a line of sight to the obstacle ($\dot{\sigma}$), and to form the forced acceleration commands based on a negation of the determined product ($v_c\cdot\dot{\sigma}$).

5. The device at an airborne vehicle according to claim 4, wherein the calculation unit is configured to form the acceleration commands based on the equation $a_y=-k\cdot v_c\cdot\dot{\sigma}$, wherein $a_y$ is the acceleration in a direction perpendicular to the travelling direction and k is a positive constant.

6. The device at an airborne vehicle according to claim 5, wherein the constant k lies within the range 1 to 6.

7. The device at an airborne vehicle according to claim 6, wherein the constant k lies within the range 2 to4.

8. The device at an airborne vehicle according to claim 7, wherein the constant k is approximately 3.

9. The device at an airborne vehicle according to claim 4, wherein the second control unit comprises a pre-calculation unit arranged to compare the time derivative of the line of sight ($\dot{\sigma}$) or an equivalence thereof to a tresholding value, and if the tresholding value is exceeded activate the calculation unit and if not exceeded, to feed a predetermined forced acceleration command to the flight control system.

10. The device at an airborne vehicle according to claim 4, wherein the second distance is determined as a function of the distance to the obstacle and the time derivative of the line of sight ($\dot{\sigma}$).

11. A method for collision avoidance in an airborne vehicle, the method comprising:

detecting with a detection unit of the airborne vehicle whether the airborne vehicle is on a collision course with an obstacle, forming forced acceleration commands with a first control unit of the airborne vehicle based on a relation between the airborne vehicle and the obstacle, and directly providing forced acceleration commands with a second control unit of the airborne vehicle to a flight control system of the airborne vehicle upon detection that the airborne vehicle is on a collision course with said obstacle so as to alter a flight path of the airborne vehicle so as to avoid collision with the obstacle.

12. The method for collision avoidance in an airborne vehicle according to claim 11, wherein detecting whether the airborne vehicle is on a collision course comprises determining a first distance to said obstacle, determining a second distance at which said obstacle is estimated to be passed, and establish that the airborne vehicle is on a collision course if the first distance is smaller than a first predetermined value and the second distances is smaller than a second predetermined value.

13. The method for collision avoidance in an airborne vehicle according to claim 12, further comprising:

continuously determining the second distance during the step of providing forced acceleration commands, and ending the step of providing forced acceleration commands to the flight control system when the second distance exceeds a predetermined third value.

14. The method for collision avoidance in an airborne vehicle according to claim 12, wherein the second distance is determined as a function of the distance to the obstacle and the time derivative of the line of sight ($\dot{\sigma}$).

15. The method for collision avoidance in an airborne vehicle according to claim 11, wherein providing forced acceleration commands to the flight control system comprises determining a product of a closing velocity ($v_c$) to the obstacle and a time derivative of a line of sight to the obstacle ($\dot{\sigma}$), and forming the forced acceleration commands based on a negation of the determined product ($v_c \cdot \dot{\sigma}$).

16. The method for collision avoidance in an airborne vehicle according to claim 15, wherein the acceleration commands are formed based on the equation $a_y = -k \cdot v_c \dot{\sigma}$, wherein $a_y$ is the acceleration in a direction perpendicular to the travelling direction and k is a positive constant.

17. The method for collision avoidance in an airborne vehicle according to claim 11, further comprising:

comparing a time derivative of a line of sight ($\dot{\sigma}$) or an equivalence thereof to a threshold value, and if comparison indicates that the threshold value is exceeded, providing forced acceleration commands to a flight control system comprises determining a product of a closing velocity ($v_c$) to the obstacle and a time derivative of a line of sight to the obstacle ($\dot{\sigma}$), and forming the forced acceleration commands based on a negation of the determined product ($v_c \cdot \dot{\sigma}$), and if the comparison indicates that the threshold value is not exceeded, providing forced acceleration commands to the flight control system comprises forming forced acceleration commands with a predetermined magnitude.

* * * * *